(12) United States Patent
Uenoyama et al.

(10) Patent No.: US 11,260,825 B2
(45) Date of Patent: *Mar. 1, 2022

(54) LOCKING AND UNLOCKING SYSTEM

(71) Applicant: TOYOTA JIDOSHA KABUSHIKI KAISHA, Toyota (JP)

(72) Inventors: Naoki Uenoyama, Nisshin (JP); Etsuko Nakajima, Nagoya (JP); Junya Masui, Nagoya (JP); Akira Hoshino, Nagoya (JP); Hideo Hasegawa, Nagoya (JP); Keiko Nakano, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,864

(22) Filed: Jun. 19, 2020

(65) Prior Publication Data

US 2020/0317159 A1 Oct. 8, 2020

Related U.S. Application Data

(63) Continuation of application No. 16/145,727, filed on Sep. 28, 2018, now Pat. No. 10,723,316.

(30) Foreign Application Priority Data

Nov. 20, 2017 (JP) .............................. JP2017-222958

(51) Int. Cl.
*B60R 25/24* (2013.01)
*B60R 25/102* (2013.01)
(Continued)

(52) U.S. Cl.
CPC ............ *B60R 25/24* (2013.01); *B60R 25/102* (2013.01); *G07C 9/00182* (2013.01);
(Continued)

(58) Field of Classification Search
CPC .. B60R 25/24; B60R 25/102; B60R 2325/205
See application file for complete search history.

(56) References Cited

U.S. PATENT DOCUMENTS

2010/0201481 A1* 8/2010 Au .......................... G08C 17/02
340/5.51
2016/0272154 A1* 9/2016 Sanji ........................ G07C 9/00
(Continued)

FOREIGN PATENT DOCUMENTS

JP 2003-252443 9/2003
JP 2006-206225 8/2006
(Continued)

Primary Examiner — Daniell L Negron
(74) Attorney, Agent, or Firm — Oblon, McClelland, Maier & Neustadt, L.L.P.

(57) ABSTRACT

A locking and unlocking system includes a controller. The controller is configured to acquire a state of locking and unlocking of a vehicle that is locked and unlocked based on locking and unlocking instruction information acquired from a portable terminal, and send a notification to a first device associated with the vehicle, when the vehicle is not locked during a period of time from when the vehicle is unlocked based on the locking and unlocking instruction information acquired from the portable terminal until a first timing.

20 Claims, 10 Drawing Sheets

(51) Int. Cl.
*H04W 12/04* (2021.01)
*G07C 9/00* (2020.01)

(52) U.S. Cl.
CPC ....... *H04W 12/04* (2013.01); *B60R 2325/205* (2013.01); *G07C 2009/0023* (2013.01)

(56) References Cited

U.S. PATENT DOCUMENTS

| | | | | |
|---|---|---|---|---|
| 2017/0330441 | A1* | 11/2017 | Lin | G08B 21/24 |
| 2018/0084589 | A1* | 3/2018 | McKinnon | H04W 76/15 |
| 2019/0005445 | A1 | 1/2019 | Bahrainwala | |

FOREIGN PATENT DOCUMENTS

| | | | |
|---|---|---|---|
| JP | 2006-316434 | A | 11/2006 |
| JP | 2010-159615 | A | 7/2010 |
| JP | 2011-241549 | A | 12/2011 |

\* cited by examiner

LOCKING AND UNLOCKING SYSTEM

INCORPORATION BY REFERENCE

This application is a continuation of U.S. application Ser. No. 16/145,727 filed Sep. 28, 2018, which claims the benefit of priority from Japanese Patent Application No. 2017-222958 filed Nov. 20, 2017, the entire contents of each of which is incorporated herein by reference.

BACKGROUND

1. Technical Field

The disclosure relates to a system for performing locking and unlocking.

2. Description of Related Art

A technique for performing delivery of a delivered article with a trunk of a load receiving vehicle designated as a delivery destination by a recipient has been proposed (refer to, for example, Japanese Unexamined Patent Application Publication No. 2006-206225 (JP 2006-206225 A)). According to the related art, the recipient designates a vehicle owned by the recipient as a delivery destination, so that the recipient can receive the delivered article even in absence without installing a home delivery locker or the like for receiving the delivered article.

SUMMARY

In the system described above, since the vehicle is unlocked by a person in charge of delivery, it is needed to reliably lock the vehicle after the completion of delivery of a package. However, in the related art, there is a problem in that forgetting to lock the vehicle may occur after the completion of the delivery.

The disclosure provides a locking and unlocking system that allows locking of an area capable of being locked and unlocked by a portable terminal to be reliably performed.

A first aspect of the disclosure relates to a locking and unlocking system including a controller. The controller is configured to acquire a state of locking and unlocking, performed using a portable terminal, of a vehicle that is locked and unlocked based on key information acquired from the portable terminal, and configured to send a notification to a first device associated with the vehicle, when the vehicle is not locked during a period of time from when the portable terminal unlocks the vehicle by using the key information until a first timing.

The locking and unlocking system according to the first aspect of the disclosure can be applied to a system that performs locking and unlocking of a vehicle by performing communication between a portable terminal and the vehicle to transfer key information. The controller is configured to acquire the locked and unlocked state of the vehicle performed using the portable terminal. For example, the fact that an unlocking operation or a locking operation has been performed by the portable terminal, a state (a locked state or an unlocked state) obtained as a result of the operation, or the like is acquired. The controller is configured to detect the fact that locking is not performed during a period of time from when the vehicle is unlocked using the portable terminal until the first timing, and sending a notification to the first device. The first timing may be any timing as long as it is a timing at which it is possible to appropriately send a notification of forgetting to lock the vehicle. The first device may be a device that is managed by an administrator of the system, or may be the portable terminal that is used for locking and unlocking. With the configuration as described above, it is possible to reduce forgetting to lock the vehicle in a case where the vehicle is unlocked by using the portable terminal.

In the locking and unlocking system according to the first aspect of the disclosure, the first device may be the portable terminal used for unlocking of the vehicle. With the configuration as described above, it is possible to immediately notify a user who unlocked the vehicle that locking has been forgotten.

In the locking and unlocking system according to the first aspect of the disclosure, the controller may be configured to send a notification to a second device associated with the vehicle, when the vehicle is not locked during a period of time from when the portable terminal unlocks the vehicle by using the key information until a second timing that is after the first timing.

According to the first aspect of the disclosure, in a case where there is no response to the notification sent at the first timing, by sending a notification to the second device different from the first device, it is possible to reliably notify that the vehicle is not locked. That is, it is possible to restrain the vehicle from being left non-locked.

In the locking and unlocking system according to the first aspect of the disclosure, the controller may be configured to perform locking on the vehicle when the vehicle is not locked during the period of time from when the portable terminal unlocks the vehicle by using the key information until the second timing.

As described above, in a case where there is no response to the notification sent at the first timing, it is preferable to take measures for performing locking, such as transmitting a signal instructing locking to the vehicle, for example.

In the locking and unlocking system according to the first aspect of the disclosure, the key information may have a time of expiration until which locking and unlocking of the vehicle is performed by the key information. The second timing may be a timing at which the time of expiration of the key information arrives.

In a case where the key information has a time of expiration and the time of expiration has passed, the vehicle cannot be locked. Therefore, a timing at which the time of expiration of the key information arrives may be set as the second timing, and a notification of the deadline may be given.

In the locking and unlocking system according to the first aspect of the disclosure, the portable terminal may be configured to perform communication with the vehicle by short-range wireless communication. The first timing may be a timing at which connection between the portable terminal and the vehicle is disconnected.

In a case where wireless connection between the portable terminal and the vehicle is disconnected, it is possible to estimate that the portable terminal is away from the vehicle. Therefore, the timing at which the wireless connection is disconnected can be set as a timing at which a notification has to be given.

In the locking and unlocking system according to the first aspect of the disclosure, the first timing may be a timing at which a predetermined time has elapsed since the portable terminal unlocked the vehicle by using the key information.

The predetermined time can be set to be, for example, a reasonable time until which the vehicle may be unlocked.

In the locking and unlocking system according to the first aspect of the disclosure, the controller may be configured to send a notification to a third device associated with the vehicle, when the vehicle is locked during the period of time from when the portable terminal unlocks the vehicle by using the key information until the first timing.

In the locking and unlocking system according to the first aspect of the disclosure, the third device may be a terminal possessed by an owner of the vehicle, or may be a server device that manages delivery of a package, or the like. According to the first aspect of the disclosure, it is possible to notify an administrator of the third device (for example, an owner of the vehicle) that the vehicle is locked without any problem.

In the locking and unlocking system according to the first aspect of the disclosure, the controller may be provided in the portable terminal. The locking and unlocking system according to the first aspect of the disclosure may further include a server device that issues the key information to the portable terminal. The controller may be provided in the server device.

According to the first aspect of the disclosure, acquisition of a state and generation of a notification may be performed by the server device that issues key information, or may be performed by the portable terminal that locks and unlocks the vehicle using key information. The executing entity can be appropriately changed according to the form of the system.

A second aspect of the disclosure relates to a locking and unlocking system including a controller. The controller is configured to acquire a state of locking and unlocking, performed using a portable terminal, of a storage device that is locked and unlocked based on key information acquired from the portable terminal, and configured to send a notification to a first device associated with the storage device, when the storage device is not locked during a period of time from when the portable terminal unlocks the storage device by using the key information until a first timing.

The aspects of the disclosure can be specified as a locking and unlocking system that includes at least a part of the means. The aspects of the disclosure can also be specified as a device (a portable terminal, a server device, a storage device, or the like) that is included in the locking and unlocking system. The aspects of the disclosure can also be specified as a method that is performed by the system or the device. The processing or the means can be implemented to be freely combined as long as technical contradiction does not occur.

According to the aspects of the disclosure, it is possible to reliably perform the locking of an area capable of being locked and unlocked by a portable terminal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Overview of System

Figure 1:
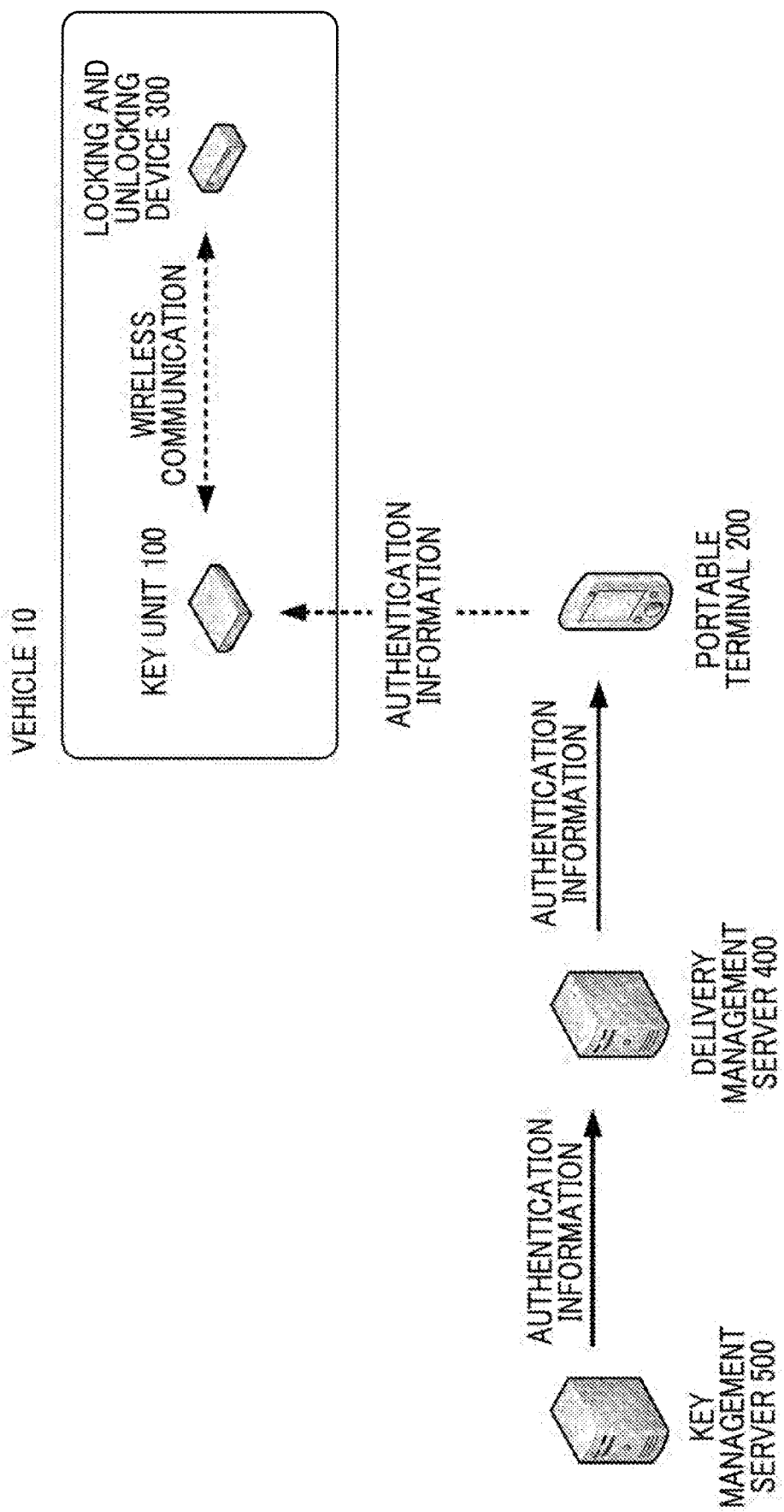
FIG. 1 is a system configuration diagram of a delivery system according to a first embodiment.

The overview of a delivery system according to a first embodiment will be described with reference to FIG. 1. The delivery system according to this embodiment is configured to include a key unit 100 and a locking and unlocking device 300 mounted on a vehicle, a portable terminal 200, a delivery management server 400, and a key management server 500. In the delivery system according to this embodiment, the key unit 100 having a wireless interface similar to an electronic key (a portable device) of a smart key is mounted on a vehicle 10, and by performing communication with the existing locking and unlocking device 300, it is possible to perform locking and unlocking of the vehicle without using a physical key. The key unit 100 performs short-range wireless communication with the portable terminal 200, and whether or not the key unit 100 serves as an electronic key of the vehicle 10 is decided based on the result of authentication of the portable terminal 200. That is, a user of the system can perform the locking and unlocking of the vehicle by operating the portable terminal 200 from the outside of the vehicle 10.

The key management server 500 is a server device that issues information (authentication information) for allowing the key unit 100 to authenticate the portable terminal 200. The key management server 500 issues authentication information to the portable terminal 200 via the delivery management server 400.

The delivery management server 400 is a server device that manages a plurality of portable terminals 20 possessed by a person in charge of delivery. Although one portable terminal 200 and one vehicle 10 are shown in FIG. 1, a plurality of portable terminals 200 may be managed by the delivery management server 400. A plurality of vehicles 10 may be accessed by the portable terminal 200.

Configuration of System

Figure 2:
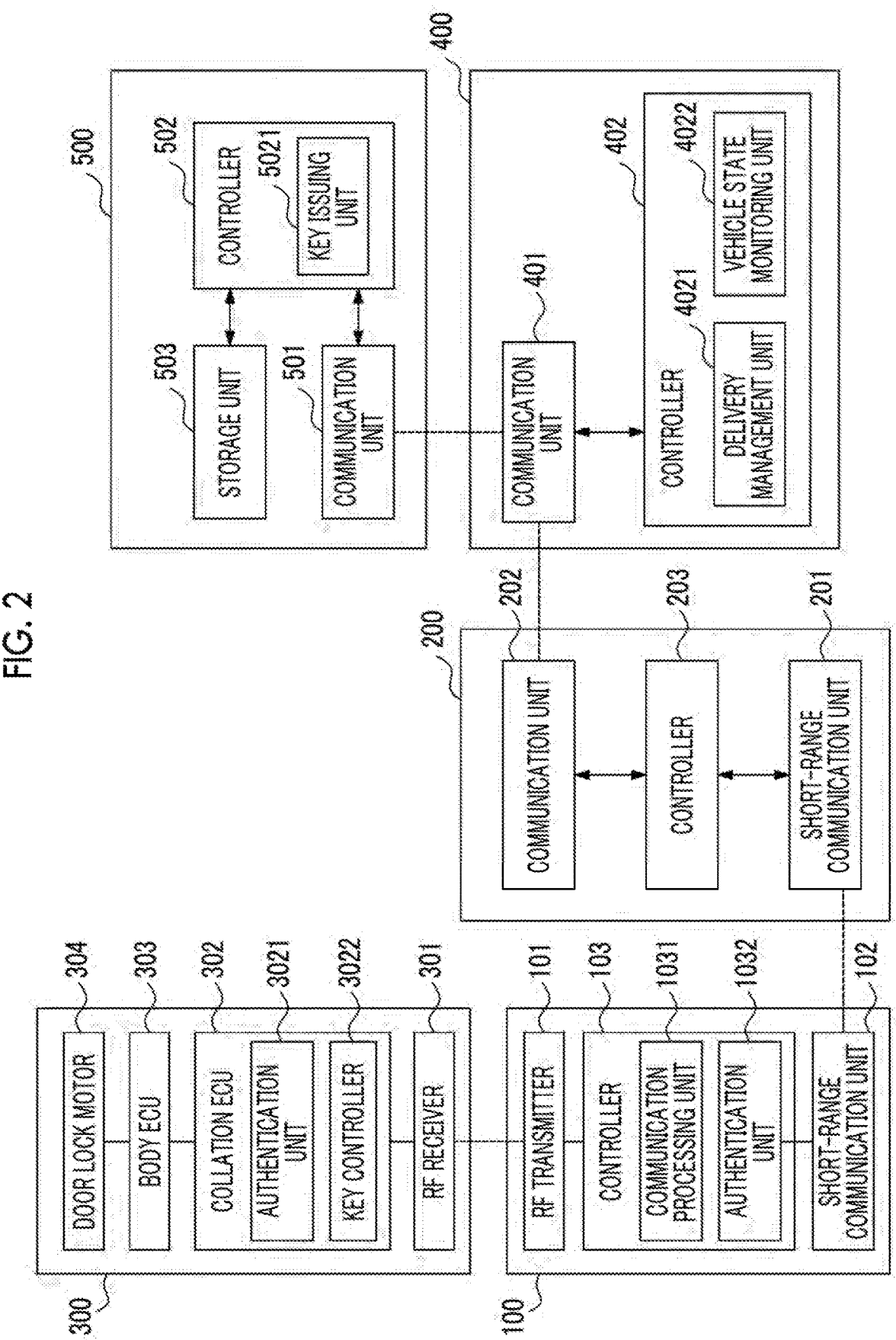
FIG. 2 is a block diagram showing constituent elements of the delivery system according to the first embodiment.

Constituent elements of the system will be described in detail. FIG. 2 is a block diagram schematically showing an example of each of the configurations of the key unit 100, the portable terminal 200, the locking and unlocking device 300, the delivery management server 400, and the key management server 500 shown in FIG. 1. Among them, the key unit 100 and the locking and unlocking device 300 are mounted on the vehicle 10 that is a target to be locked and unlocked.

The locking and unlocking device 300 is a device for locking and unlocking a door of a vehicle and is an existing device configuring a part of the locking and unlocking system. Specifically, the locking and unlocking device 300 receives a locking signal and an unlocking signal that are transmitted from an electronic key (hereinafter referred to as a portable device) possessed by a user of the vehicle through a radio wave of a radio frequency (hereinafter referred to as RF) band. The locking and unlocking device 300 locks and unlocks the door of the vehicle 10 according to the signal.

In this embodiment, instead of the portable device possessed by the user, the key unit 100 transmits the radio wave of the RF band, thereby controlling the locking and unlocking of the door of the vehicle. The locking and unlocking device 300 can also communicate with the portable device of the electronic key. However, unless otherwise specified, a communication destination of the locking and unlocking device 300 will be described as being limited to the key unit 100.

The locking and unlocking device 300 is configured to include an RF receiver 301, a collation electronic control unit (ECU) 302, a body ECU 303, and a door lock motor 304. The locking and unlocking device 300 operates with electric power that is supplied from an auxiliary machine battery (not shown) mounted on the vehicle 10.

The RF receiver 301 is means for receiving a radio wave of a high frequency band (for example, in a range of 100 MHz to 1 GHz) transmitted from the key unit 100. The RF receiver 301 is installed at anyplace in a vehicle cabin.

The collation ECU 302 is a computer that performs control of locking and unlocking of the door of the vehicle 10, based on the signal (the locking signal or the unlocking signal) transmitted from the key unit 100 through the radio wave of the RF band. The collation ECU 302 is configured of, for example, a microcomputer. In the following description, the locking signal and the unlocking signal are collectively referred to as a locking and unlocking signal. The word "locking and unlocking signal" represents at least one of the locking signal and the unlocking signal.

The collation ECU 302 has an authentication unit 3021 and a key controller 3022 as functional modules. Each of the functional modules may be realized by executing a program stored in storage means such as a read only memory (ROM) by a central processing unit (CPU)(none of which are shown).

The authentication unit 3021 authenticates the fact that the locking and unlocking signal transmitted from the key unit 100 is a signal transmitted from an authorized device. Specifically, whether or not a key ID included in the locking and unlocking signal coincides with a key ID stored in storage means (not shown) of the collation ECU 302 in advance is determined. Specific contents will be described later.

The key controller 3022 transmits an unlocking command or a locking command to the body ECU 303 (described later), based on the result of the authentication performed by the authentication unit 3021. The signal is transmitted through an in-vehicle network such as a controller area network (CAN).

The body ECU 303 is a computer that controls the body of the vehicle. The body ECU 303 has a function of performing the unlocking and locking of the door of the vehicle by controlling the door lock motor 304 (described later), based on the received unlocking command or locking command. The body ECU 303 may further have a function of performing control of elements related to a vehicle body, such as control of a power window, seat adjustment, anti-theft, control of a seat belt, control of headlights, and the like.

The door lock motor 304 is an actuator for locking and unlocking the door (also including a trunk, in addition to a door for getting on and off or a rear gate) of the vehicle 10.

The door lock motor 304 operates based on a signal transmitted from the body ECU 303.

The key unit 100 will be described. The key unit 100 is a device disposed in the cabin of the vehicle 10. The key unit 100 has a function of authenticating the portable terminal 200 by performing short-range wireless communication with the portable terminal 200, and a function of transmitting the locking and unlocking signal by using the radio wave of the RF band, based on the result of the authentication of the portable terminal 200. The key unit 100 is configured to include an RF transmitter 101, a short-range communication unit 102, and a controller 103.

In this embodiment, the key unit 100 is disposed at a predetermined position in the vehicle cabin (for example, in a glove box) and operates with electric power that is supplied from the auxiliary machine battery (not shown) mounted on the vehicle 10.

The RF transmitter 101 is a module that transmits the locking and unlocking signal to the key unit 100 through the radio wave of the RF band.

The short-range communication unit 102 is a module that performs communication with the portable terminal 200 possessed by the user. The short-range communication unit 102 performs communication at a short distance (to the extent that communication can be performed inside and outside the vehicle cabin) by using a predetermined wireless communication standard.

In this embodiment, the short-range communication unit 102 performs data communication by the Bluetooth (registered trademark) Low Energy standard (hereinafter referred to as BLE). The BLE is a low-power communication standard by Bluetooth and has a feature that communication can be started immediately by detecting a partner without requiring pairing between devices. In this embodiment, the BLE is exemplified. However, other wireless communication standards can also be used. For example, near field communication (NFC), ultra wide band (UWB), Wi-Fi (registered trademark), or the like can also be used.

The controller 103 is a module that performs short-range wireless communication with the portable terminal 200 through the short-range communication unit 102 and performs control to authenticate the portable terminal 200 and control to transmit the locking and unlocking signal, based on the authentication result. The controller 103 is configured of, for example, a microcomputer.

The controller 103 includes a communication processing unit 1031 and an authentication unit 1032 as functional modules. Each of the functional modules may be realized by executing a program stored in storage means such as a ROM by a CPU (none of which are shown).

The communication processing unit 1031 processes communication with the portable terminal 200 through the short-range communication unit 102. Specifically, the communication processing unit 1031 receives a locking request or an unlocking request (hereinafter collectively referred to as a locking and unlocking request) from the portable terminal 200 and generates a locking and unlocking signal in response to the received request. The generated locking and unlocking signal is temporarily stored and is output at a timing at which the authentication unit 1032 (described later) has successfully authenticated the portable terminal 200.

The authentication unit 1032 performs authentication of the portable terminal 200, based on authentication information that is included in the locking and unlocking request transmitted from the portable terminal 200. Specifically, the authentication information stored in the storage means (not shown) is compared with the authentication information transmitted from the portable terminal 200, and in a case where both the authentication information items coincide with each other, a determination that the authentication is successful is made. In a case where both the authentication information items do not coincide with each other, a determination that the authentication is unsuccessful is made. In a case where the authentication unit 1032 successfully authenticates the portable terminal 200, the locking and unlocking signal generated by the communication processing unit 1031 is wirelessly transmitted to the locking and unlocking device 300 through the RF transmitter 101. An authentication method that is performed by the authentication unit 1032 may be a method of simply verifying both kinds of authentication information to verify identity or may be a method using asymmetric cipher. Hereinafter, as needed for description, the authentication information that is stored in the key unit 100 is referred to as device authentication information, and the authentication information that is transmitted from the portable terminal 200 is referred to as terminal authentication information.

The key unit 100 simultaneously transmits the ID of the electronic key (hereinafter referred to as a key ID) along with the locking and unlocking signal to the locking and unlocking device 300. The key ID may be stored in the key unit 100 in advance in a plaintext state or may be stored in a state of being encrypted by cipher specific to the portable terminal 200. In a case where the key ID is stored in an encrypted state, the encrypted key ID may be decrypted by the authentication information transmitted from the portable terminal 200 such that the original key ID is obtained.

The portable terminal 200 will be described. The portable terminal 200 is a compact computer such as a smartphone, a mobile phone, a tablet terminal, a personal information terminal, a wearable computer (a smart watch or the like), for example. The portable terminal 200 is configured to include a short-range communication unit 201, a communication unit 202, and a controller 203.

The short-range communication unit 201 is means for performing communication with the key unit 100 according to the same communication standard as that of the short-range communication unit 102. The communication unit 202 is communication means for connecting the portable terminal 200 to a network. In this embodiment, it is possible to perform communication with another device (for example, the delivery management server 40) via the network by using a mobile communication service such as third-generation (3G) or long term evolution (LTE).

The controller 203 is means for governing the control of the portable terminal 200. The controller 203 performs, for example, processing of generating a locking and unlocking request, processing of acquiring the terminal authentication information described above, processing of transmitting the locking and unlocking request and the terminal authentication information to the key unit 100, and the like. The controller 203 is configured of, for example, a microcomputer. The controller 203 may realize the above-described processing by executing a program stored in storage means such as a ROM by a CPU (none of which are shown).

The controller 203 is connected to an input-output unit (not shown) that performs interaction with the user. The input-output unit is configured of, for example, a touch panel and control means of the touch panel, or a liquid crystal display and control means of the liquid crystal display. In this embodiment, the touch panel and the liquid crystal display are composed of a single touch panel display.

The controller 203 displays an operation screen through the input-output unit and generates an unlocking request or a locking request, based on the operation performed by the user. For example, the controller 203 outputs an icon for performing unlocking, an icon for performing locking, or the like to the touch panel display. The controller 203 generates an unlocking request or a locking request, based on the operation performed by the user. The operation performed by the user is not limited to an operation through the touch panel display. For example, the operation may be an operation by a hardware switch or the like.

The controller 203 performs processing of acquiring the terminal authentication information. In this embodiment, the terminal authentication information is generated in the key management server 500 (described later) and transferred to the portable terminal 200 through the delivery management server 400 (described later). In a case where the portable terminal 200 does not have the terminal authentication information, the locking operation and the unlocking operation from the operation screen are not possible.

The terminal authentication information that is acquired by the portable terminal 200 may be an immutable key or a one-time key. In either case, the device authentication information corresponding to the terminal authentication information is stored in the key unit 100 in advance.

The delivery management server 400 will be described. The delivery management server 400 is a server device that manages a package to be delivered and the portable terminals 200 possessed by a plurality of persons in charge of delivery. The delivery management server 400 stores delivery information of a target package. In a case where the vehicle 10 is designated as a delivery location for the target package, the delivery management server 400 acquires the terminal authentication information for locking and unlocking the vehicle 10 that accommodates the package, from the key management server 500, and transfers it to the portable terminal 200. The processing is performed with a request from the portable terminal 200 possessed by the person in charge of delivery as the starting point. The delivery management server 400 is configured includes a communication unit 401 and a controller 402.

The communication unit 401 is a communication interface for performing communication with the portable terminal 200 and the key management server 500 via a network, similar to the communication unit 202. The controller 402 is means for governing the control of the delivery management server 400. The controller 402 is configured of, for example, a CPU. The controller 402 includes a delivery management unit 4021 and a vehicle state monitoring unit 4022 as functional modules. Each of the functional modules may be realized by executing a program stored in storage means such as a ROM by a CPU (none of which are shown).

The delivery management unit 4021 is means for storing and managing information about the user who is a consignee, the vehicle 10 that is under the management of the user and is a delivery destination, a package associated with the user, and the like. When the delivery management unit 4021 receives information about the package to be delivered from the portable terminal 200, the delivery management unit 4021 specifies the vehicle 10 that is a delivery destination, and requests the key management server 500 of issuing of the terminal authentication information for locking and unlocking the vehicle 10. The delivery management unit 4021 transfers the terminal authentication information issued by the key management server 500 to the portable terminal 200. The vehicle state monitoring unit 4022 is means for monitoring the locked and unlocked state of the vehicle 10, based on the information transmitted from the portable terminal 200, and generating an alert in a case where the locking and unlocking processing is not completed in a normal sequence. Specific processing will be described later.

The key management server 500 will be described. The key management server 500 is a device that issues terminal authentication information that is used by the portable terminal 200, in response to the request from the delivery management server 400. The key management server 500 is configured to include a communication unit 501, a controller 502, and a storage unit 503.

The communication unit 501 is a communication interface for performing communication with the delivery management server 400 via a network, similar to the communication unit 401.

The controller 502 is means for governing the control of the key management server 500. The controller 502 is configured of, for example, a CPU. The controller 502 includes a key issuing unit 5021 as a functional module. The functional module may be realized by executing a program stored in storage means such as a ROM by a CPU (none of which are shown).

The key issuing unit 5021 issues terminal authentication information in response to the request from the delivery management server 400. The terminal authentication information is authentication information for causing the portable terminal 200 to perform the locking and unlocking of the vehicle 10 through the key unit 100, as described above. In a case where the key issuing unit 5021 receives a terminal authentication information issue request from the delivery management server 400, the key issuing unit 5021 issues terminal authentication information that is terminal authentication information directed to a corresponding portable terminal 200 and corresponds to the key unit 100 provided in the target vehicle 10 (that is, corresponds to the device authentication information stored in the key unit). The terminal authentication information may be acquired from terminal authentication information stored in advance, or may be generated dynamically. For example, authentication information valid solely in a predetermined period of time, authentication information having the specified number of times of use, authentication information capable of being used solely in a predetermined portable terminal 200, and the like can be generated. In a case where the vehicle 10 has a plurality of areas capable of being independently locked and unlocked, such as a vehicle cabin or a trunk, terminal authentication information corresponding to either of them may be generated.

Figure 3:
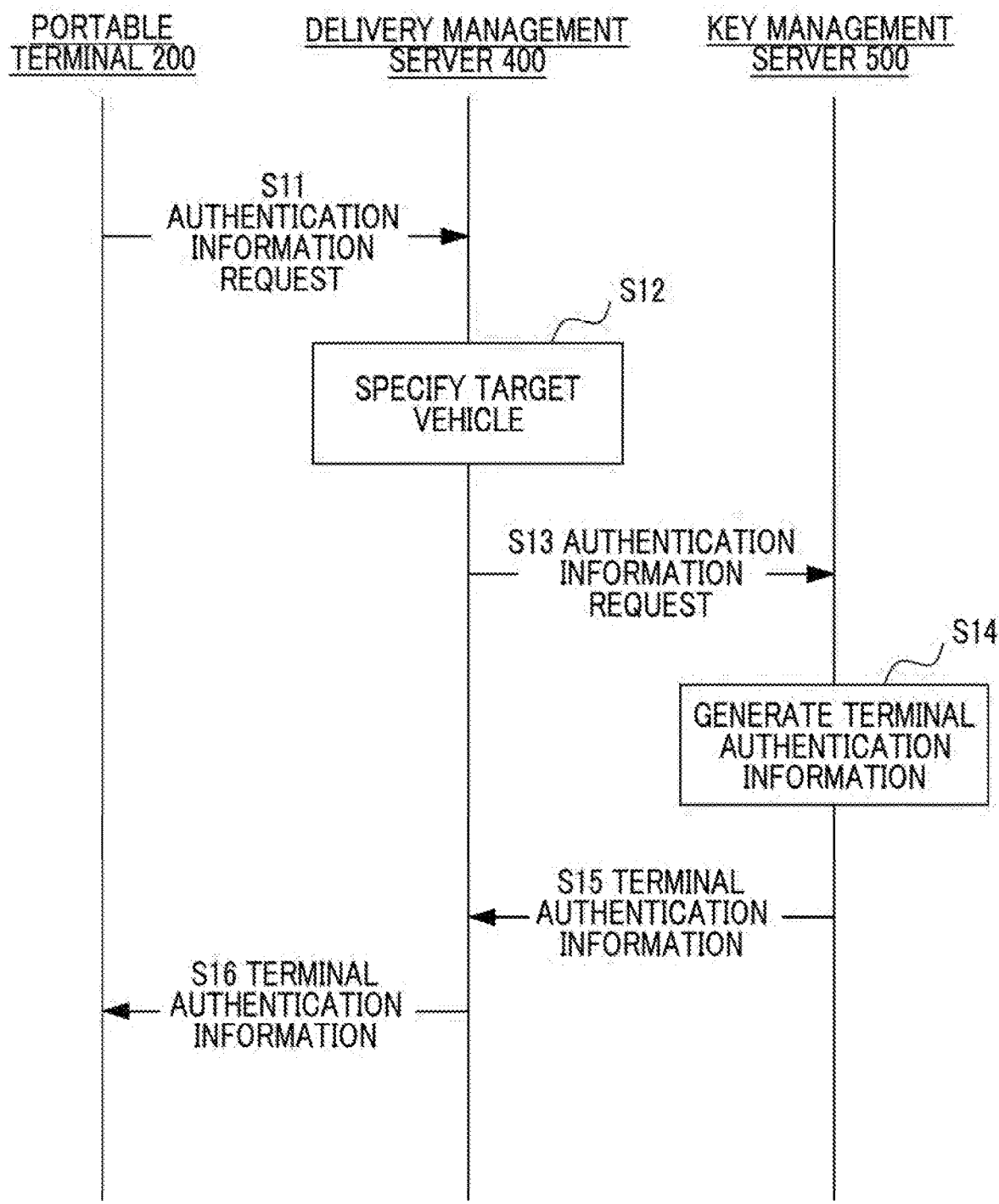
FIG. 3 is a flow diagram for describing a flow of acquisition of authentication information in the first embodiment.
Figure 4:
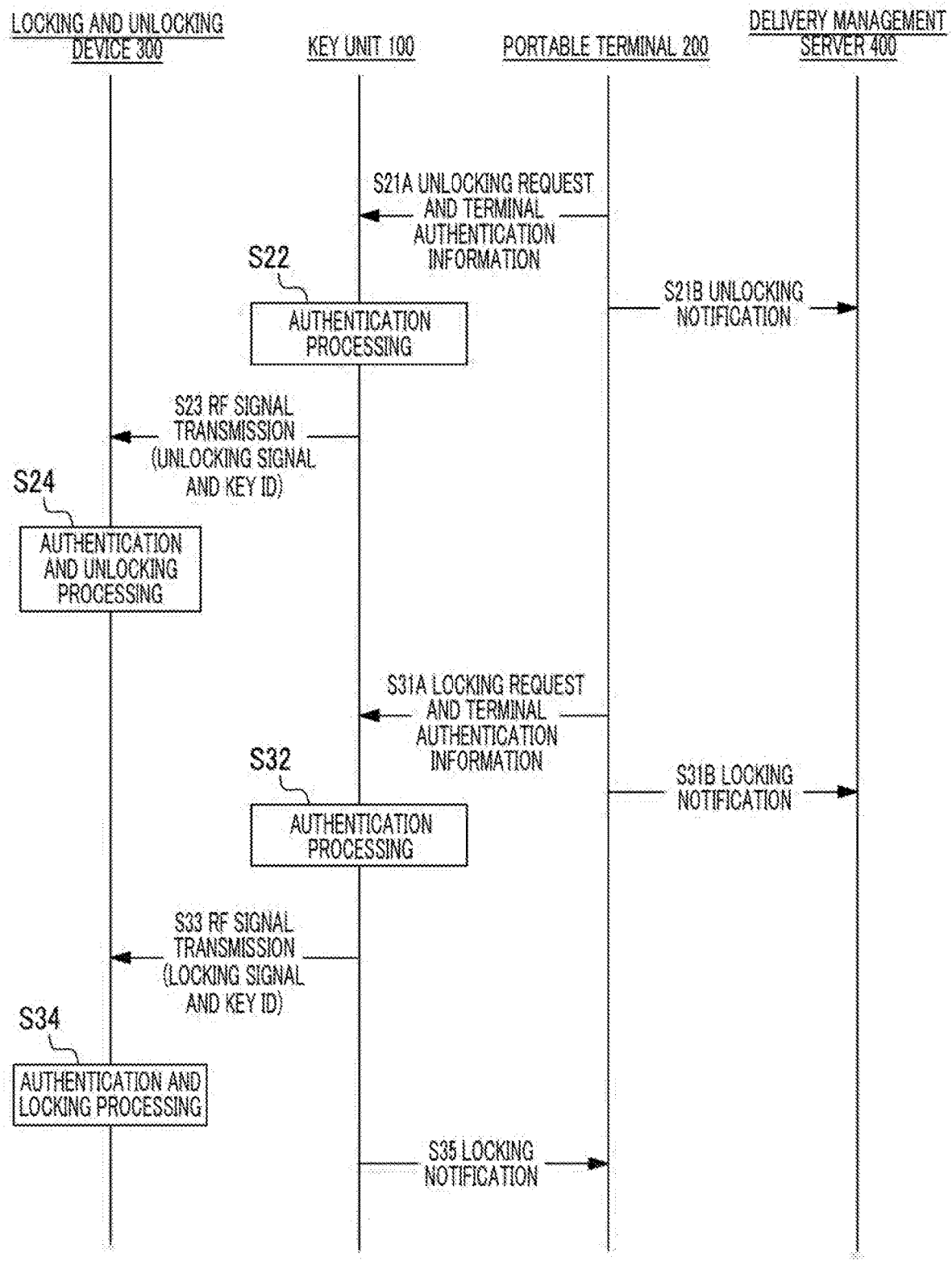
FIG. 4 is a flow diagram for describing a flow of data in the first embodiment.

The storage unit 503 is means for storing information and is configured of a storage medium such as a random access memory (RAM), a magnetic disk, a flash memory, or the like. The storage unit 503 stores terminal authentication information corresponding to the key unit 100 or various data for generating the terminal authentication information, Operation of System Processing that is performed by each of the constituent elements described above will be described. The processing can be divided into a phase (a first phase) in which the portable terminal 200 acquires terminal authentication information, and a phase (a second phase) in which the portable terminal 200 accesses the key unit 100 by using the acquired terminal authentication information and locks and unlocks the vehicle. FIG. 3 is a flow diagram showing a flow of data in the first phase, and FIG. 4 is a flow diagram showing a flow of data in the second phase.

The first phase will be described with reference to FIG. 3. The processing in Steps S11 to S15 is executed in a case where there is a request to issue terminal authentication information from the portable terminal 200. First, in Step S11, the portable terminal 200 requests the delivery management server 400 to issue terminal authentication information. In the step, information for identifying the portable terminal 200 and information for identifying the package (package information, for example, a slip number) are simultaneously transmitted as an authentication information request.

In Step S12, the delivery management server 400 (the delivery management unit 4021) specifies the vehicle 10 that is a delivery destination, based on the acquired package information and the information stored in advance. Subsequently, an identifier of the vehicle 10 is added to the package information, and an authentication information request is transmitted to the key management server 500 (Step S13).

In Step S14, the key issuing unit 5021 generates terminal authentication information specific to the portable terminal 200 and the vehicle 10 (the key unit 100 mounted on the vehicle 10). In this embodiment, a time of expiration is set in the terminal authentication information. The time of expiration can be set to be, for example, a period from the issuance time of the terminal authentication information to a timing at which a predetermined time has elapsed.

Next, in Step S15, the generated terminal authentication information is transmitted to the delivery management server 400 (Step S15). The delivery management server 400 transfers the terminal authentication information to the portable terminal 200 (Step S16). By the above, an operation of unlocking the vehicle 10 becomes possible on the portable terminal 200. The transferred terminal authentication information is temporarily stored in the delivery management server 400 (for example, until the time of expiration of the terminal authentication information arrives). In this example, the terminal authentication information is transferred via the delivery management server 400. However, the terminal authentication information may be directly transmitted from the key management server 500 to the portable terminal 200.

The processing in Steps S11 to S16 is preparatory processing for performing locking and unlocking, and therefore, it is desirable to perform the processing in advance. For example, the processing may be executed at a preparatory stage of delivery.

The second phase will be described with reference to FIG. 4. Steps S21 to S24 are processing for unlocking the vehicle 10 by using the portable terminal 200. The user of the portable terminal 200 (that is, the person in charge of delivery) performs an operation of unlocking the vehicle 10 through the input-output unit. As a result, a link by BLE is established between the portable terminal 200 and the key unit 100. Therefore, in Step S21A, the portable terminal 200 transmits an unlocking request and terminal authentication information to the key unit 100. In this case, a notification indicating that the unlocking request has been transmitted is simultaneously transmitted to the delivery management server 400 (Step S21B).

In Step S22, the authentication unit 1032 included in the key unit 100 collates the terminal authentication information transmitted from the portable terminal 200 with the device authentication information stored in advance and performs authentication processing. In a case where the authentication is successful, in Step S23, the communication processing unit 1031 included in the key unit 100 transmits the unlocking signal and the key ID to the locking and unlocking device 300. In Step S24, the authentication unit 3021 included in the locking and unlocking device 300 performs authentication processing, based on the received key ID. As a result, in a case where the authentication is successful, the key controller 3022 unlocks the door of the vehicle 10.

Steps S31 to S35 are processing for locking the vehicle 10 by using the portable terminal 200. When the user of the portable terminal 200 performs an operation of locking the vehicle 10 through the touch panel screen, in Step S31A, the portable terminal 200 transmits a locking request and terminal authentication information to the key unit 100. In this case, a notification indicating that the locking request has been transmitted is simultaneously transmitted to the delivery management server 400 (Step S31B).

In Step S32, the authentication unit 1032 included in the key unit 100 compares the terminal authentication information transmitted from the portable terminal 200 with the device authentication information stored in advance and performs authentication processing. In a case where the authentication is successful, in Step S33, the communication processing unit 1031 included in the key unit 100 transmits the locking signal and the key ID to the locking and unlocking device 300. In Step S34, the authentication unit 3021 included in the locking and unlocking device 300 performs authentication processing, based on the received key ID. As a result, in a case where the authentication is successful, the key controller 3022 locks the door of the vehicle 10.

The communication processing unit 1031 included in the key unit 100 transmits a notification indicating that the locking has been completed (a locking notification) to the portable terminal 200 after the transmission of the locking signal (Step S35). By the above, the notification indicating that the locking has been completed is output onto the touch panel screen of the portable terminal 200. In a case where the terminal authentication information is a one-time key, the one-time key may be invalidated at the timing of Step S35.

As described with reference to FIG. 4, in a case where locking and unlocking are completed according to a normal sequence, two kinds of information; the unlocking notification (Step S21B) and the locking notification (Step S31B), are transmitted to the delivery management server 400. In this embodiment, in a case where both the unlocking notification and the locking notification are not correctly received, the delivery management server 400 determines that forgetting to lock the vehicle has occurred, and generates an alert.

Figure 5:
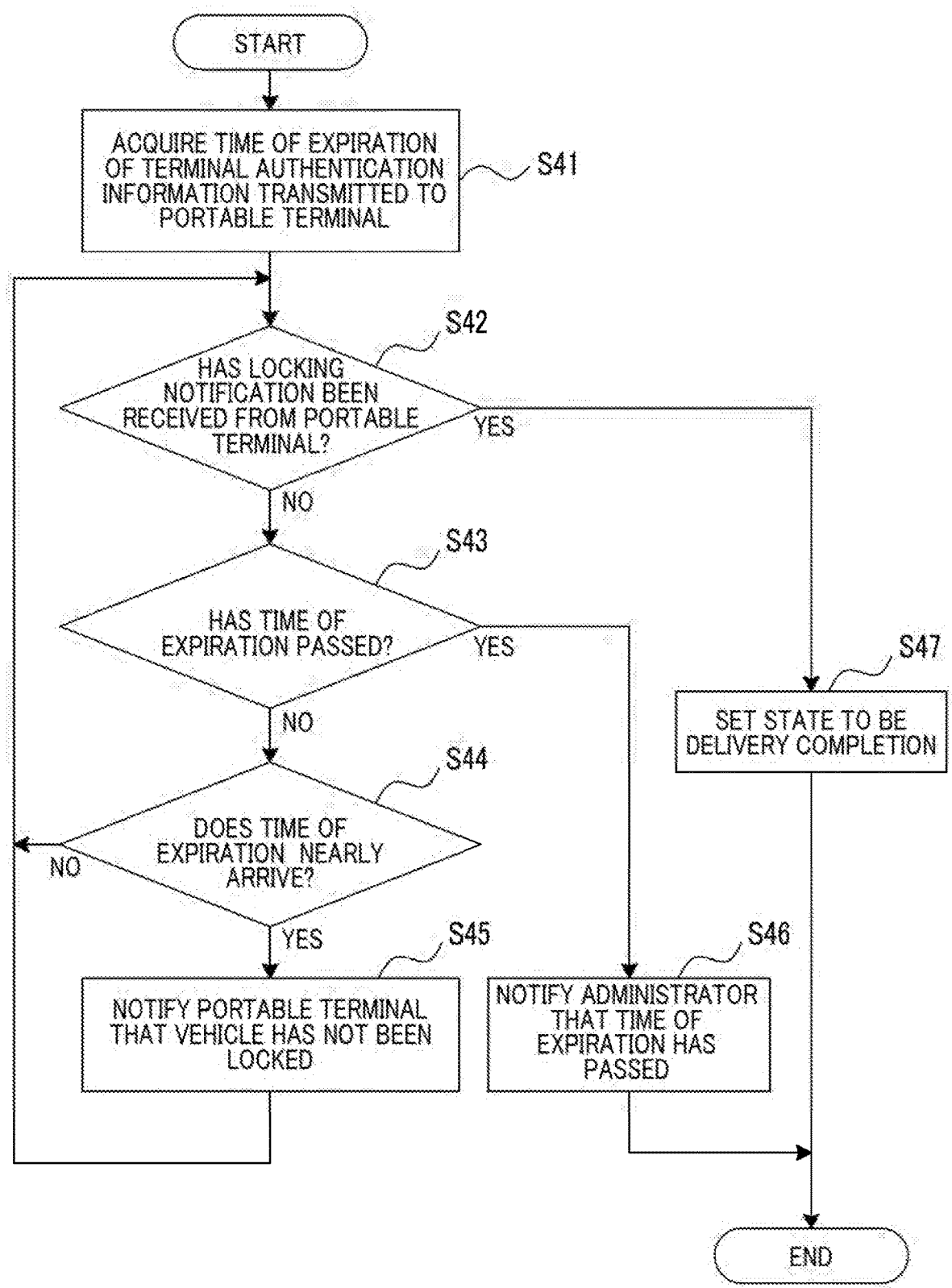
FIG. 5 is a flowchart of processing that is performed by a delivery management server in the first embodiment.

Processing of detecting the fact that forgetting to lock the vehicle has occurred will be described. FIG. 5 is a flowchart of processing of detecting forgetting to lock the vehicle 10. The processing shown in FIG. 5 is started by the vehicle state monitoring unit 4022 in a case where the delivery management server 400 has received the unlocking notification in Step S21B.

First, in Step S41, the time of expiration of the terminal authentication information transmitted in Step S16 is acquired. Next, in Step S42, whether or not a locking notification (to be transmitted in Step S31B) has been received from the portable terminal 200 is determined. As a result, in a case where the locking notification has been received, it can be seen that unlocking and locking of the vehicle 10 has been completed in a correct sequence. Therefore, the delivery management unit 4021 sets the state of a corresponding package to be "delivery completion" (Step S47), and ends the processing.

In a case where the locking notification has not been received, in Step S43, whether or not the time of expiration of the terminal authentication information has passed is determined. As a result, in a case where the time of expiration has not arrived, the processing proceeds to Step S44. In Step S44, whether or not the time of expiration nearly arrives is determined. In this step, for example, an affirmative determination may be made in a case where the remaining time before the time of expiration is shorter than a predetermined time (for example, 1 minute, 3 minutes, or the like). In a case where an affirmative determination is made in Step S44, in Step S45, the portable terminal 200 is notified that the vehicle has not been locked yet. In this way, the portable terminal 200 informs the person in charge of delivery that the vehicle has to be locked, with sound, an image, or the like.

On the other hand, in Step S43, in a case where the time of expiration of the terminal authentication information has passed, it is estimated that the terminal authentication information has been expired while the vehicle 10 is in an unlocked state (that locking cannot be performed). Therefore, the fact that the time of expiration has passed is notified to the administrator of the system (Step S46). The notification may be sent through input-output means (not shown) included in the delivery management server 400, or may be performed by transmitting information to another device.

As described above, according to the first embodiment, it is possible to send a notification to the user who possesses the portable terminal 200, before the time of expiration of the terminal authentication information arrives. Therefore, it is possible to reduce forgetting to lock the vehicle. In a case where the terminal authentication information has been expired, it is possible to send a notification to the system administrator.

It goes without saying that the system of this embodiment can also be constructed by using a facility or a storage device capable of being locked and unlocked using the portable terminal 200, instead of the vehicle 10.

Second Embodiment

In the first embodiment, the delivery management server 400 monitors the locked and unlocked state of the vehicle. In contrast to the above, a second embodiment is an embodiment in which the portable terminal 200 monitors the locked and unlocked state of the vehicle.

Figure 6:
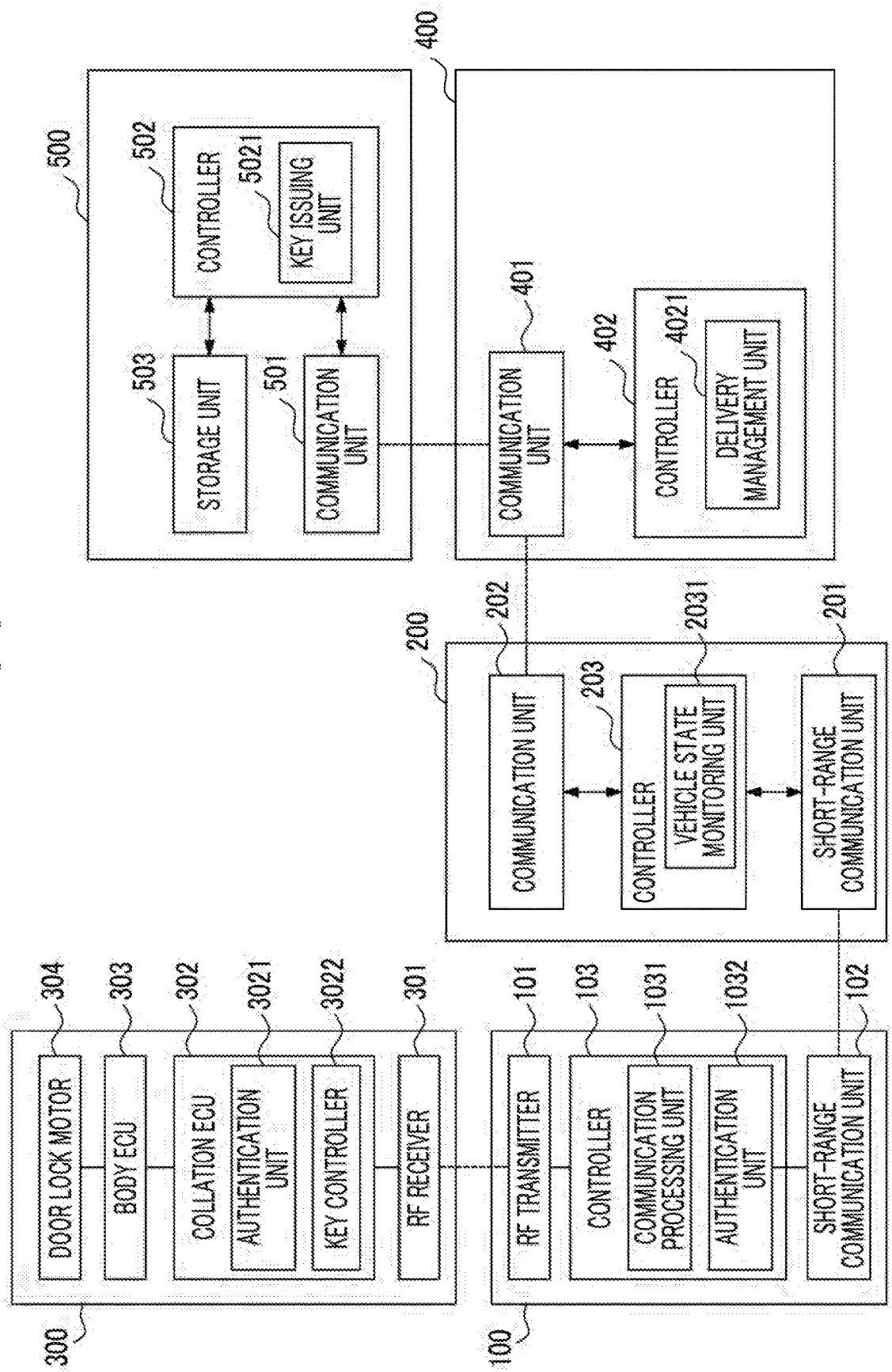
FIG. 6 is a block diagram showing constituent elements of a delivery system according to a second embodiment.

FIG. 6 is a system configuration diagram of a delivery system according to the second embodiment. The second embodiment is different from the first embodiment in that the functional module of the vehicle state monitoring unit 4022 is disposed in the portable terminal 200 (a vehicle state monitoring unit 2031) instead of the delivery management server 400.

Figure 7:
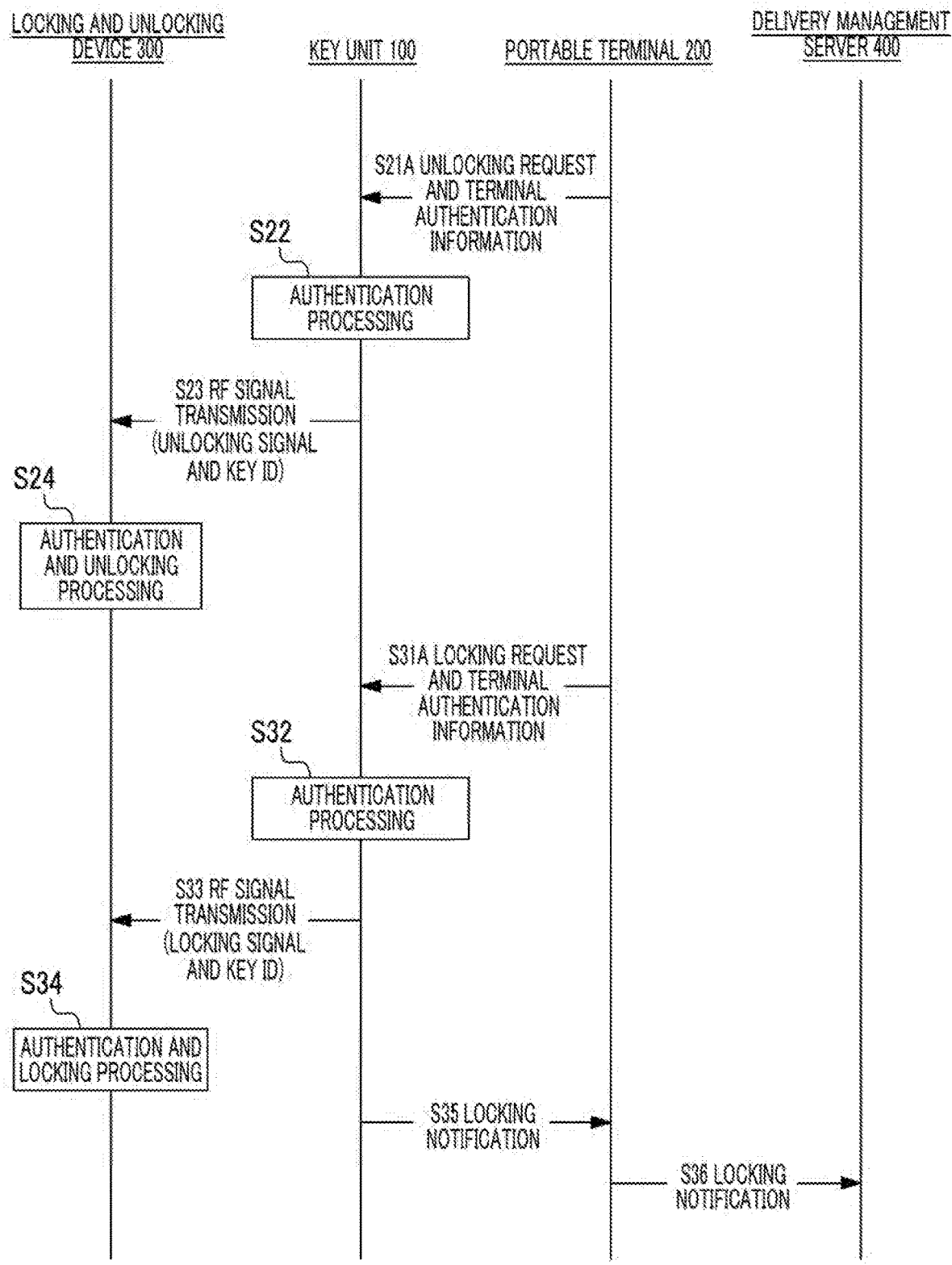
FIG. 7 is a flow diagram for describing a flow of data in the second embodiment.

FIG. 7 is a diagram showing a flow of data in the second embodiment. In this embodiment, the transmission of the unlocking notification in Step S21B and the transmission of the locking notification in Step S31B are omitted, and instead, solely the locking notification is transmitted in Step S36.

Figure 8:
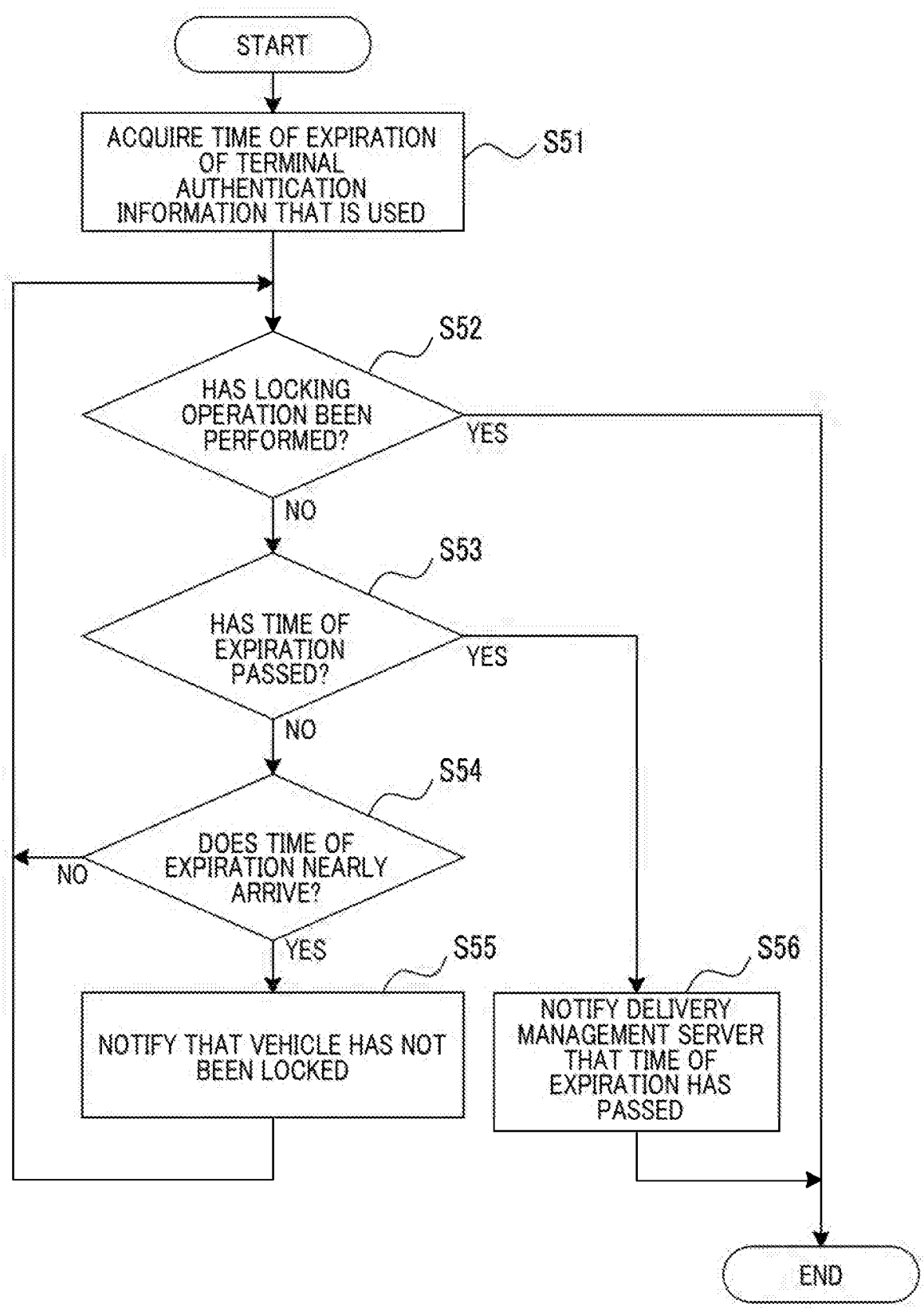
FIG. 8 is a flowchart of processing that is performed by a portable terminal in the second embodiment.

FIG. 8 is a flowchart of processing of detecting forgetting to lock the vehicle 10 in the second embodiment. The processing shown in FIG. 7 is started by the vehicle state monitoring unit 2031 at a timing at which the portable terminal 200 transmits the unlocking request in Step S21A.

The processing shown in FIG. 8 is similar to the processing shown in FIG. 5. However, the processing shown in FIG. 8 is different from the processing shown in FIG. 5 in that in Step S51, the portable terminal 200 itself acquires the time of expiration of the terminal authentication information. The processing shown in FIG. 8 is different from the processing shown in FIG. 5 in that in Step S52, the portable terminal 200 itself determines whether or not a locking operation has been performed. The processing shown in FIG. 8 is different from the processing shown in FIG. 5 in that in Step S55, the portable terminal 200 itself generates a notification. The processing shown in FIG. 8 is different from the processing shown in FIG. 5 in that in Step S56, the portable terminal 200 transmits a notification to the delivery management server 400.

In a case where locking has been completed according to a normal sequence, in Step S36, a locking notification is transmitted to the delivery management server 400. When the locking notification is received, the delivery management unit 4021 sets the state of a corresponding package to be "delivery completion".

According to the second embodiment, the portable terminal 200 detects that the locking operation has not been performed on the vehicle 10. Therefore, it is possible to rapidly perform a notification.

Third Embodiment

In the second embodiment, the time of expiration of the terminal authentication information is used as a timing at which a notification is given. In contrast to the above, a third embodiment is an embodiment utilizing a wireless connection state between the portable terminal 200 and the key unit 100.

As described above, wireless connection by BLE is performed between the portable terminal 200 and the key unit 100. That is, the portable terminal 200 can determine whether or not the key unit 100 is within a communication range. Using the determination result described above, in the third embodiment, in a case where the portable terminal 200 deviates from the communication range of the key unit 100 without performing the locking of the vehicle 10, a notification is performed. The system configuration of the locking and unlocking system according to the third embodiment is the same as that of the second embodiment, and therefore, solely differences in processing will be described.

Figure 9:
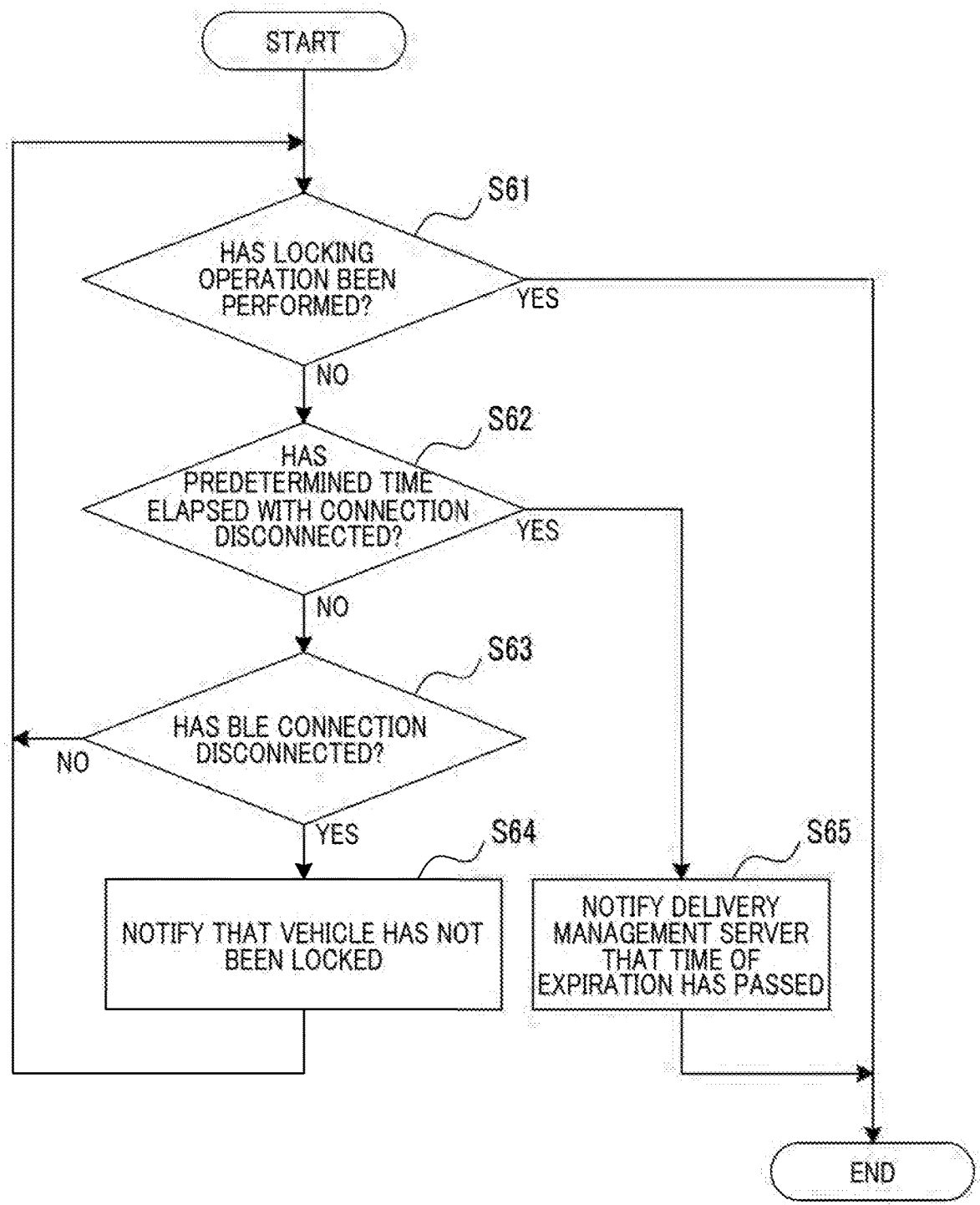
FIG. 9 is a flowchart of processing that is performed by a portable terminal in the third embodiment.

FIG. 9 is a flowchart of processing of detecting forgetting to lock the vehicle 10 in the third embodiment. The processing shown in FIG. 9 is started by the vehicle state monitoring unit 2031 of the portable terminal 200 at a timing at which the portable terminal 200 transmits an unlocking request in Step S2A.

First, in Step S61, whether or not a locking operation has been performed is determined. In a case where the locking operation has not been performed yet, in Step S62, whether or not the connection by BLE has been disconnected and a predetermined time has then elapsed without recovering forgetting to lock the vehicle is determined. As a result, in a case where a negative determination is made, the processing proceeds to Step S63. In Step S63, whether or not the connection by BLE has been disconnected is determined. In this step, in a case where the connection has been lost while the locking operation has not been performed, an affirmative determination is made. In a case where an affirmative determination is made in Step S63, in Step S64, a notification that the vehicle has not been locked yet is given.

In Step S62, in a case where a predetermined time has elapsed while the connection has been disconnected, a determination that it is not possible to recover forgetting to lock the vehicle is made, and the delivery management server 400 is notified that a predetermined time has elapsed while the connection has been disconnected (Step S65). The notification may be performed through input-output means (not shown) of the delivery management server 400, or may be performed by transmitting information to another device.

According to the third embodiment, it is possible to detect the fact that the person in charge of delivery has left the vehicle 10 without performing locking. Therefore, a notification of forgetting to lock the vehicle can be performed at an appropriate timing.

In the third embodiment, a notification to the portable terminal 200 is performed at a timing at which the wireless connection between the portable terminal 200 and the key unit 100 is lost. However, as long as it is possible to detect the fact that the portable terminal 200 is away from the vehicle 10 by a predetermined distance or more, other methods may be used. For example, in a case where position information representing a location where the vehicle 10 has been unlocked or position information of the vehicle 10 is held in the portable terminal 200. In a case where a deviation of a predetermined value or more occurs between the position information and the position information obtained by positioning, a determination that the portable terminal 200 is away from the vehicle 10 by a predetermined distance or more may be made.

Fourth Embodiment

In the first to third embodiments, in a case where forgetting to lock the vehicle occurs and recovery of forgetting to lock the vehicle is not expected, a notification to the delivery management server 400 is performed. In contrast to the above, a fourth embodiment is an embodiment in which a locking command is transmitted to the vehicle 10.

Figure 10:
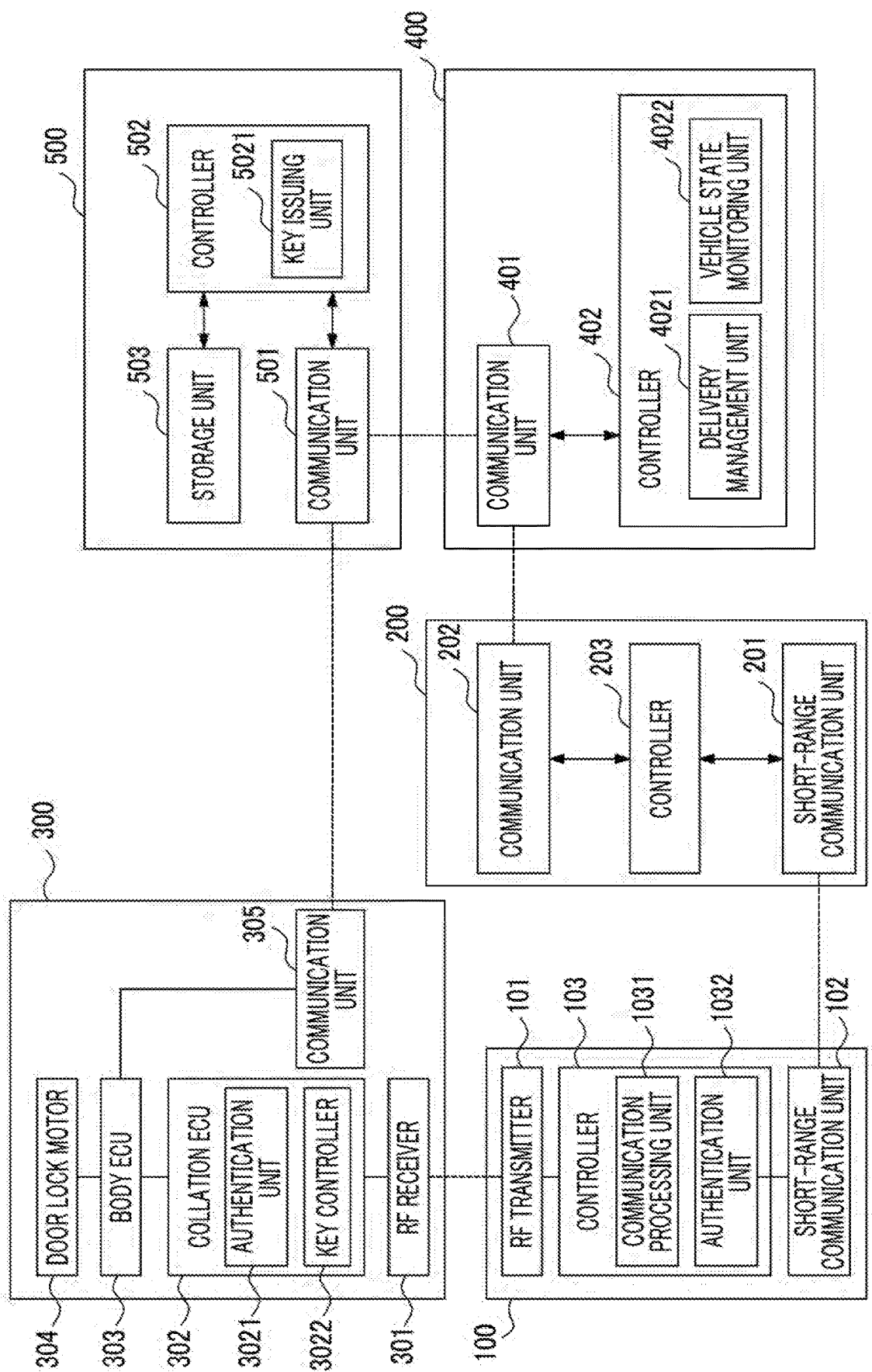
FIG. 10 is a block diagram showing constituent elements of a delivery system according to a fourth embodiment.

FIG. 10 is a system block diagram of a delivery system according to the fourth embodiment. The fourth embodiment is different from the above-described embodiments in that the locking and unlocking device 300 has a communication unit 305 and the communication unit 305 can directly communicate with the key management server 500.

In the fourth embodiment, in a case where forgetting to lock the vehicle occurs and recovery of forgetting to lock the vehicle is not expected (Steps S46, S56, S65, and the like), the fact that recovery of forgetting to lock the vehicle is not expected is notified to the system administrator and notified to the key management server 5W through the delivery management server 400. The key management server 500 generates a signal (a locking command) for locking a corresponding vehicle 10 and transmits the signal to the body ECU 303 through the communication unit 501 and the communication unit 305. The body ECU 303 drives the door lock motor 304, based on the locking command, to lock the vehicle 10. According to the mode as described above, it is possible to recover forgetting to lock of the vehicle 10.

Modification Example

The embodiments described above are merely examples, and the disclosure can be implemented by appropriately changing the embodiments within a scope that does not depart from the gist of the disclosure.

For example, in the description of the embodiments, a notification timing (first and second timings in the disclosure) is determined based on the time of expiration of the terminal authentication information and the presence or absence of wireless connection by BLE. However, the notification timing may be determined using information other than the time of expiration and the presence or absence of the wireless connection. In the description of the embodiments, a device that performs a first stage notification (a first device in the disclosure) is set to be the portable terminal 200. However, a notification may be sent to a device other than the portable terminal 20. Similarly, in the description of the embodiments, a device that performs a second stage notification (a second device in the disclosure) is set to be the delivery management server 400. However, a notification may be sent to a device other than the delivery management server 400.

In the first and second embodiments, the determinations in Steps S43 (S53) and S44 (S54) are performed based on the time of expiration associated with the terminal authentication information. However, the determinations may be made based on a timing at which the vehicle 10 has been unlocked. For example, in Step S41 (S51), a first notification timing and a second notification timing may be set based on a timing at which the vehicle 10 has been unlocked (or a timing at which an unlocking notification is received). In Step S43 (53), whether or not the first notification timing has passed may be determined. In Step S44 (S54), whether or not the second notification timing has passed may be determined. The first notification timing is a timing of notifying the portable terminal 200 that the vehicle has not been locked. The second notification timing is a timing of notifying the system administrator that a predetermined deadline has passed. In any case, for example, setting can be performed, such as "after n minutes from the unlocking of the vehicle 10". In this case, it is not necessarily needed to associate the time of expiration with the terminal authentication information.

In the description of the embodiments, a notification is performed solely in a case where abnormality was found in the locking and unlocking sequence. However, in a case where the vehicle 10 is locked in a normal sequence, a notification may be transmitted to a predetermined device (a third device in the disclosure). For example, a notification indicating that the delivery has been normally completed may be transmitted to a portable terminal (not shown) possessed by a consignee or the delivery management server 400.

In a case where the time of expiration of the terminal authentication information has passed or a case where it is predicted that the time of expiration passes, a procedure for extending the deadline of the terminal authentication information may be made based on an operation by the person in charge of delivery.

In the first embodiment, the locked and unlocked state of the vehicle 10 is transmitted from the portable terminal 200 to the delivery management server 400. In the second embodiment, the portable terminal 200 itself acquires the locked and unlocked state of the vehicle 10. However, the locked and unlocked state of the vehicle 10 may be transmitted from the vehicle 10. In a case where the vehicle 10 is provided with communication means, the locked and unlocked state may be transmitted to, for example, a device that performs a determination (for example, the delivery management server 400 or the like).

In the description of the embodiments, a vehicle cabin or a trunk of an automobile is exemplified as an area where package storage and locking and unlocking are possible. However, there is no limitation to the above. The disclosure is also applicable to targets (a facility, a storage device, or the like) other than an automobile as long as it has an area capable of being locked and unlocked by using a portable terminal.

In the description of the embodiments, the delivery management server 400 monitors the locked state of the vehicle 10. However, the monitoring of the locked state of the vehicle 10 may be performed by the key management server 500. The delivery management server 400 and the key management server 500 may be the same computer.

What is claimed is:

1. A locking and unlocking system comprising:
 a controller configured to:
 acquire a state of locking and unlocking of a vehicle that is locked and unlocked based on instruction information acquired within a valid period of authentication from a portable terminal; and
 transmit a notification to a device when the vehicle is not locked during a period of time from when the vehicle is unlocked based on the instruction information until a timing that arrives after the valid period of the authentication expires,
 wherein the controller is configured to transmit a notification to a second device, when the vehicle is locked during the period of time from when the vehicle is unlocked based on the instruction information acquired from the portable terminal until a second timing.

2. The locking and unlocking system according to claim 1, wherein the device is the portable terminal used for unlocking of the vehicle.

3. The locking and unlocking system according to claim 1, wherein the controller is configured to perform locking on the vehicle when the vehicle is not locked for the period of time until the timing.

4. The locking and unlocking system according to claim 1, wherein the portable terminal is configured to perform communication with the vehicle by short-range wireless communication.

5. The locking and unlocking system according to claim 1, wherein the second timing is a timing that arrives before the valid period of the authentication expires.

6. The locking and unlocking system according to claim 5, wherein the second device is a terminal associated with an owner of the vehicle.

7. The locking and unlocking system according to claim 1, wherein the controller is provided in the portable terminal.

8. The locking and unlocking system according to claim 1, wherein the vehicle further acquires authentication information, which is information for authenticating the portable terminal, from a portable terminal, and accepts the instruction information within the valid period of authentication when the authentication is successful.

9. The locking and unlocking system according to claim 8, wherein the device is a server device that issues the authentication information to the portable terminal.

10. The locking and unlocking system according to claim 9, wherein the valid period of the authentication is specified by the server device.

11. The locking and unlocking system according to claim 1, wherein the controller is provided in a server device.

12. A vehicle comprising the locking and unlocking system according to claim 1.

13. A locking and unlocking system, comprising:
 a controller configured to:
 acquire a state of locking and unlocking of a storage device that is locked and unlocked based on instruction information acquired within a valid period of authentication from a portable terminal; and
 transmit a notification to a device when the storage device is not locked during a period of time from when the storage device is unlocked based on the instruction information until a timing that arrives after the valid period of the authentication expires, wherein the controller is configured to transmit a notification to a second device, when the vehicle is locked during the period of time from when the vehicle is unlocked based on the instruction information acquired from the portable terminal until a second timing.

14. The locking and unlocking system according to claim 13, wherein the device is the portable terminal used for unlocking of the vehicle.

15. The locking and unlocking system according to claim 13, wherein the controller is configured to perform locking on the vehicle when the vehicle is not locked for the period of time until the timing.

16. A vehicle comprising the locking and unlocking system according to claim 13.

17. A locking and unlocking system, comprising:
a locking and unlocking device; and
a server device,
wherein the locking and unlocking device has a controller configured to:
acquire a state of locking and unlocking of a vehicle that is locked and unlocked based on instruction information acquired within a valid period of authentication from a portable terminal, and
transmit a notification to the server device, when the vehicle is not locked during a period of time from when the vehicle is unlocked based on the instruction information until a timing that arrives after the valid period of the authentication expires, wherein the controller is configured to transmit a notification to a second device, when the vehicle is locked during the period of time from when the vehicle is unlocked based on the instruction information acquired from the portable terminal until a second timing.

18. The locking and unlocking system according to claim 17, wherein the controller is configured to perform locking on the vehicle when the vehicle is not locked for the period of time until the timing.

19. The locking and unlocking system according to claim 17, wherein the valid period of the authentication is specified by the server device.

20. A portable terminal, comprising:
a controller configured to:
transmit instruction information to a vehicle within a valid period of authentication so that the vehicle is locked and unlocked based on the instruction information; and
transmit a notification to a device when the instruction information for locking the vehicle is not transmitted during a period of time from when the locking and unlocking instruction information for unlocking the vehicle is transmitted until a timing that arrives after the valid period of the authentication expires,
wherein the controller is configured to transmit a notification to a second device, when the vehicle is locked during the period of time from when the vehicle is unlocked based on the instruction information acquired from the portable terminal until a second timing.

* * * * *